(12) United States Patent
Halliday

(10) Patent No.: US 8,752,040 B2
(45) Date of Patent: Jun. 10, 2014

(54) UPGRADE TRACKING SYSTEM

(75) Inventor: Matthew Halliday, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 930 days.

(21) Appl. No.: 12/163,094

(22) Filed: Jun. 27, 2008

(65) Prior Publication Data

US 2009/0113411 A1    Apr. 30, 2009

Related U.S. Application Data

(63) Continuation of application No. 11/923,181, filed on Oct. 24, 2007, now Pat. No. 8,255,899.

(51) Int. Cl.
*G06F 9/445*    (2006.01)

(52) U.S. Cl.
USPC ............................................ 717/172; 717/175

(58) Field of Classification Search
USPC ................................................... 717/100–140
See application file for complete search history.

(56) References Cited

U.S. PATENT DOCUMENTS

| | | | |
|---|---|---|---|
| 5,537,590 A | | 7/1996 | Amado |
| 5,586,304 A * | | 12/1996 | Stupek et al. ................. 717/170 |
| 5,701,400 A | | 12/1997 | Amado |
| 6,151,608 A | | 11/2000 | Abrams |
| 6,151,707 A * | | 11/2000 | Hecksel et al. ............... 717/178 |
| 6,975,830 B2 | | 12/2005 | Banerjee et al. |
| 7,007,049 B2 | | 2/2006 | Peng |
| 7,093,247 B2 | | 8/2006 | Ashworth et al. |
| 7,110,936 B2 * | | 9/2006 | Hiew et al. ...................... 703/22 |
| 7,779,304 B2 | | 8/2010 | Jennings |
| 2002/0100036 A1 * | | 7/2002 | Moshir et al. ................. 717/173 |
| 2006/0116981 A1 | | 6/2006 | Krimmel et al. |
| 2008/0313498 A1 | | 12/2008 | Jennings |
| 2009/0112895 A1 | | 4/2009 | Halliday |
| 2009/0113410 A1 | | 4/2009 | Halliday |

OTHER PUBLICATIONS

Non-Final Office Action for U.S. Appl. No. 11/923,181 mailed on May 25, 2011, 9 pages.
Non-Final Office Action for U.S. Appl. No. 12/163,103 mailed on Sep. 15, 2011, 13 pages.
Final Office Action for U.S. Appl. No. 11/923,181 mailed on Nov. 15, 2011, 9 pages.

* cited by examiner

*Primary Examiner* — Chuck Kendall
(74) *Attorney, Agent, or Firm* — Kilpatrick Townsend & Stockton LLP

(57) ABSTRACT

An upgrade tracking system for tracking aspects of an application upgrade. In various embodiments, the update tracking system includes a statistics collection component configured to collect statistics related an execution of the application upgrade, where the application upgrade includes a plurality of data upgrade files, and where the plurality of data upgrade files are organized into a plurality of functional upgrade groups. The system further includes a timing component configured to report execution timings related to the execution of the application upgrade, and a status component configured to track statuses related to the execution of the application upgrade.

20 Claims, 13 Drawing Sheets

ARE120.7:GSISAN Bugs

Failed Scripts
- Fixed 4
- Skipped 11
- Total 15

Long Running (>20 Mins) Scripts
- Fixed 6
- Finished 25
- Skipped 5
- Total 36

Documentation Bugs
- Total 0

Expand All | Collapse All

| # | Issue Type | Product | Filename | Bugs (Status) | Reported Date PST | Resolved In Instance | Skipped |
|---|---|---|---|---|---|---|---|
| 1 | Performance | Subledger Accounting | xlanotb.sql 120.3 | 5408582 (32) | 02:29 25-JUL-2006 | N | N |
| 2 | Performance | Oracle Payables | ap_invoice_distributions_u2.sql 120.0 | 5401383 (35) | 06:20 20-JUL-2006 | N | N |
| 3 | Performance | Oracle Payables | addstn.sql 120.4 | 5406060 (35) | 08:22 21-JUL-2006 | N | N |
| 4 | Performance | Oracle Human Resources | Unknown | 5412121 (36) | 11:10 26-JUL-2006 | N | N |
| 5 | Performance | Oracle Payables | arstca01.sql 120.21 | 5400229 (36) | 20:53 19-JUL-2006 | N | Y |
| 6 | Performance | Oracle Financials Common Modules | oamoconv.sql 120.5 | 5413352 (36) | 00:16 27-JUL-2006 | N | N |
| 7 | Performance | Oracle E-Business Tax | zxpotxmiquod.sql 120.29 | 5400852 (37) | 02:34 20-JUL-2006 | N | N |
| 8 | Performance | Oracle Receivables | ar120brk.sql 120.2 | 5408579 (37) | 02:25 25-JUL-2006 | N | N |
| 9 | Performance | Oracle E-Business Tax | zxrxemptmig5.sql 120.17 | 5409252 (37) | 23:49 24-JUL-2006 | N | N |

FIG. 8

| Product | Object Names | Object Type | R11i Size (MB) | R12 Size (MB) | Delta (MB) | % Growth | % Database Growth |
|---|---|---|---|---|---|---|---|
| Financials | | | | | | | |
| ⊞ AMW | | | 43 | 250 | 207 | 481.4% | 0.1% |
| ⊟ AP | | | 214,508 | 289,111 | 74,603 | 34.8% | 35.0% |
| AP | AP_INVOICE_DISTS_ARCH | TABLE | 0 | 27,343 | 27,343 | | 12.8% |
| AP | AP_INVOICE_LINES_ALL | TABLE | 0 | 25,352 | 25,352 | | 11.9% |
| AP | AP_INVOICE_DISTRIBUTIONS_ALL | TABLE | 27,343 | 35,948 | 8,605 | 31.5% | 4.0% |
| AP | AP_EXP_REPORT_DISTS_ALL | TABLE | 108 | 3,556 | 3,448 | 3192.6% | 1.6% |
| AP | AP_INVOICE_DISTS_ARCH_N14 | INDEX | 0 | 2,164 | 2,164 | | 1.0% |
| AP | AP_INVOICE_DISTRIBUTIONS_N14 | INDEX | 2,164 | 136 | -2,028 | -93.7% | -1.0% |
| AP | AP_INVOICE_DISTS_ARCH_N18 | INDEX | 0 | 1,808 | 1,808 | | 0.8% |
| AP | AP_INVOICE_DISTRIBUTIONS_N18 | INDEX | 1,808 | 152 | -1,656 | -91.6% | -0.8% |
| AP | AP_INVOICE_DISTS_ARCH_N5 | INDEX | 0 | 1,592 | 1,592 | | 0.7% |
| AP | AP_INVOICE_DISTS_ARCH_N4 | INDEX | 0 | 1,574 | 1,574 | | 0.7% |
| ⊞ AR | | | 374,889 | 377,948 | 3,059 | 0.8% | 1.4% |
| ⊞ AX | | | 43,099 | 43,571 | 473 | 1.1% | 0.2% |
| BIC | | | 11 | 11 | 0 | | |
| ⊞ CE | | | 2,159 | 2,549 | 390 | 18.1% | 0.2% |
| ⊞ FA | | | 16,882 | 17,041 | 159 | 0.9% | 0.1% |
| ⊞ FII | | | 84,503 | 86,065 | 1,562 | 1.8% | 0.7% |
| ⊞ FUN | | | 0 | 1,404 | 1,404 | | 0.7% |
| ⊞ FV | | | 37 | 105 | 68 | 183.8% | 0.0% |
| ⊞ GL | | | 459,866 | 463,484 | 3,619 | 0.8% | 1.7% |
| ⊞ HZ | | | 235,995 | 245,423 | 9,427 | 4.0% | 4.4% |
| IA | | | 1 | 1 | 0 | | |
| ⊞ IBY | | | 516 | 4,667 | 4,151 | 804.5% | 1.9% |
| ⊞ IEX | | | 23 | 174 | 151 | 656.5% | 0.1% |

*FIG. 11*

UPGRADE TRACKING SYSTEM

CROSS-REFERENCES TO RELATED APPLICATIONS

The present application is a continuation of U.S. application Ser. No. 11/923,181, filed Oct. 24, 2007, now U.S. Publication No. 2009-0113410, published Apr. 30, 2009, entitled "Techniques for Upgrade Dependency Management," the entire contents of which is herein incorporated by reference for all purposes.

The present application also incorporates by reference for all purposes the entire contents of the following commonly-assigned, non-provisional US applications:

(1) U.S. Non-Provisional application Ser. No. 12/163,103, filed Jun. 27, 2008, now U.S. Publication No. 2009-0112895, published Apr. 30, 2009, entitled "Database Size Tracking and Reporting for Application Upgrades".

BACKGROUND OF THE INVENTION

Embodiments of the present invention relate to software applications, and more particularly relate to techniques for managing aspects of application upgrades.

Upgrades (i.e., patches) for data-driven software applications typically include a number of data upgrade files. These data upgrade files are run against a back-end database of the application, and are generally used to migrate existing application data, seed new application data, and/or modify the application data model to support new and/or enhanced features. In many cases, the execution of one data upgrade file in a patch run will depend on prior executions of one or more other data upgrade files in the patch run. Thus, it is important to track these dependencies and sequence the execution of the data upgrade files accordingly.

In practice, most software developers and development teams do not follow an organized methodology for tracking and managing upgrade dependencies. Rather, they typically determine how to order the execution of data upgrade files within a particular patch run on ad-hoc, file-by-file basis. For example, assume development team A creates an upgrade script "A.sql" and places A.sql in execution phase "X" of an upgrade. Further, assume development team B subsequently creates an upgrade script "B.sql," which depends on A.sql. Observing that A.sql is set to run in phase X, development team B may decide to place B.sql in a random downstream phase "X+Y" to ensure that B.sql executes after A.sql.

Typically, team B will not be aware of other data upgrade files created by other teams that are also dependent on A.sql. Similarly, team A may not be aware of downstream dependencies on A.sql. (e.g., B.sql). This creates several problems. First, different developers/development teams cannot effectively consolidate the execution of data upgrade files across functional/team boundaries, often resulting in unnecessary execution phases within an upgrade. For example, assume development team C creates an upgrade script "C.sql," which is dependent on A.sql (but independent of B.sql). Like team B, team C may decide to place C.sql in an execution phase that is downstream from phase X to ensure that C.sql executes after A.sql. However, since team C is unaware of B.sql, team C may decide to place C.sql in a random downstream phase "X+Z" that is different from phase X+Y. As a result, B.sql and C.sql are forced to execute serially, even though they are independent and can be executed simultaneously (i.e., in the same phase). This type of situation undesirably increases the total running time of the upgrade and the downtime of the system to be patched.

Second, development teams cannot easily modify the execution order of data upgrade files within an upgrade without breaking downstream dependencies. For example, if team A moves A.sql to a later execution phase "X+A" (perhaps because of an upstream dependency change) the dependency between A.sql and B.sql and/or the dependency between A.sql and C.sql may be broken. Even if B.sql and C.sql are moved in response to A.sql, those changes might break additional downstream dependencies. The key problem is that no one has a holistic view of all of the inter-file dependencies that may be included in an upgrade. As a result, it is extremely difficult, particularly for large and complex upgrades, to anticipate all of the downstream effects of modifying the sequencing of data upgrade files.

Accordingly, it is desirable to have improved techniques for managing the dependencies of an application upgrade.

BRIEF SUMMARY OF THE INVENTION

Embodiments of the present invention address the foregoing and other such problems by providing techniques for managing dependencies between data upgrade files included in an application upgrade. According to one set of embodiments, the data upgrade files are grouped into functional upgrade groups. A dependency hierarchy for the functional upgrade groups is then created based on dependencies between the data upgrade files. The dependency hierarchy provides a high-level, functional view of the overall dependency flow of an upgrade. In various embodiments, this allows for greater insight into existing and potential dependency issues, leading to more robust and efficient upgrades. In further embodiments, an upgrade tracking system is provided. The upgrade tracking system is configured to track and report detailed analytics related to one or more upgrade runs. In various embodiments, the upgrade tracking system may leverage the grouping of data upgrade files into functional upgrade groups to provide intelligent reporting at a functional level.

According to one embodiment of the present invention, a method for managing dependencies between data upgrade files included in an application upgrade comprises grouping the data upgrade files into functional upgrade groups. A dependency hierarchy is then defined for the functional upgrade groups based on the dependencies between the data upgrade files. In various embodiments, the method may further comprise executing the application upgrade by executing the data upgrade files, and thereafter validating whether the data upgrade files were executed in an order consistent with the dependency hierarchy.

In one set of embodiments, the step of defining the dependency hierarchy includes associating each functional upgrade group with an execution phase. An execution phase represents an execution order for data upgrade files included in the functional upgrade group. In addition, the step of validating whether the data upgrade files were executed in an order consistent with the dependency hierarchy includes validating whether each data upgrade file was executed in the execution phase identified for the data upgrade file's functional upgrade group.

In further embodiments, each functional upgrade group is associated with an upgrade token that uniquely identifies the functional upgrade group, and each data upgrade file includes a reference to the upgrade token of the file's functional upgrade group. In some embodiments, this reference is included in an upgrade definition section defined in each data upgrade file. To validate whether each data upgrade file was executed in the execution phase identified for the data upgrade file's functional upgrade group, the upgrade definition section of the file is parsed to identify the upgrade token included in the section. The functional upgrade group associated with the identified upgrade token is then identified. Finally, the execution phase of this identified functional upgrade group is compared with the actual execution phase in which the data upgrade was run.

According to another embodiment of the present invention, an upgrade tracking system is provided. The update tracking system includes a statistics collection component configured to collect statistics related an execution of an application upgrade, where the application upgrade includes a plurality of data upgrade files, and where the plurality of data upgrade files are organized into a plurality of functional upgrade groups. The system further includes a timing component configured to report execution timings related to the execution of the application upgrade, and a status component configured to track statuses related to the execution of the application upgrade.

In one set of embodiments, the execution timings include execution timings of individual data upgrade files in the plurality of data upgrade files. In additional embodiments, the execution timings may include aggregate execution timings of data upgrade files per functional update group, product family, or some other category. In an exemplary embodiment, the timing component is configured to generate intelligent reports based on execution timings, such as a report that identifies a critical path for the upgrade.

In another set of embodiments, the status component is configured to automatically determine a responsible party for each data upgrade file or each functional upgrade group. One or more status updates may then be received from the responsible party. The one or more status updates may include, for example, an update of a success status indicating whether the data upgrade file or functional upgrade group was executed successfully during the execution of the application upgrade. The one or more status updates may also include an update of a completion status indicating whether the responsible party has completed validation of the data upgrade file or functional upgrade group. The one or more status updates may further include an update of a performance status indicating whether the responsible party has completed a performance review of the data upgrade file or functional upgrade group.

In some embodiments, the status component is configured to automatically log a bug against the responsible party after the execution of the application upgrade. In this manner, the responsible party may be reminded to provide the one or more status updates described above.

In another set of embodiments, the upgrade tracking system further includes a bug integration component configured to report bugs logged against one or more data upgrade files in the plurality of data upgrade files as a result of the execution of the application upgrade. In various embodiments, this reporting is performed by accessing a bug database communicatively coupled with the bug integration component, identifying one or more bugs in the bug database that include a predefined template, and collecting bug information from each identified bug by parsing the predefined template.

In another set of embodiments, the upgrade tracking system further includes a file history component configured to report history information for each data upgrade file in the plurality of data upgrade files. The history information may include, for example, information related to prior executions of the data upgrade file, and execution timings for the prior executions.

According to another embodiment of the present invention, a method for determining database object growth comprises recording baseline sizes for a plurality of database objects, where the baseline sizes are recorded prior to the execution of an application upgrade, and recording upgraded sizes for the plurality of database objects, where the upgraded sizes are recorded subsequent to the execution of the application upgrade. Growth values for the plurality of database objects are then determined based on the baseline sizes and the upgraded sizes.

In additional embodiments, the method may further comprise organizing the plurality of database objects into one or more functional groups or product families, and reporting aggregate database object growth per functional group or product family. In various embodiments, the aggregate database object growth per functional group or product family may be represented by an absolute value, a percentage value, a percentage of total database growth, or the like.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which:

FIG. 6 illustrates an exemplary screen display of the upgrade tracking system that shows timing information in accordance with an embodiment of the present invention.

FIG. 7 illustrates an exemplary screen display of the upgrade tracking system that shows status information in accordance with an embodiment of the present invention.

FIG. 8 illustrates an exemplary screen display of the upgrade tracking system that shows bug information in accordance with an embodiment of the present invention.

FIG. 11 is an exemplary screen display of the upgrade tracking system that shows database sizing information in accordance with an embodiment of the present invention.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Figure 1:
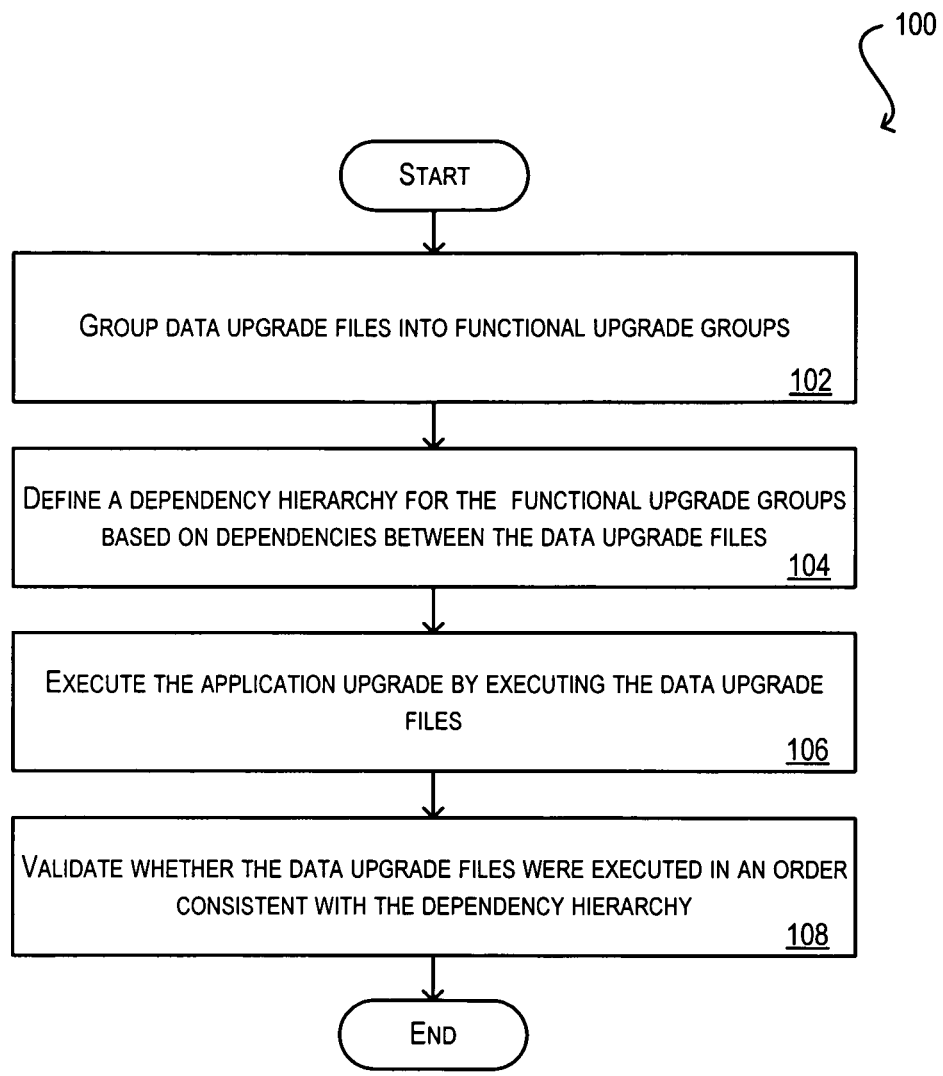
FIG. 1 illustrates a flowchart of the steps performed in managing upgrade dependencies in accordance with an embodiment of the present invention.

FIG. 1 illustrates a flowchart 100 of the steps performed in managing dependencies between data upgrade files in accordance with an embodiment of the present invention. Using this technique, upgrade dependencies may be managed at a functional level, allowing for greater insight into, and control over, the building and testing of application upgrades. In various embodiments, the processing of flowchart 100 may be implemented in software, hardware, or combinations thereof. For example, as software, flowchart 100 may be implemented as part of an automated upgrade management application. Further, portions of flowchart 100 may be performed manually (i.e., through human intervention). One of ordinary skill in the art would recognize many variations, modifications, and alternatives.

At step 102, data upgrade files that are included as part of an application upgrade are grouped into functional upgrade groups. The functional upgrade groups correspond to functional areas or modules encompassed by the upgrade. In some embodiments, the functional upgrade groups may be fairly granular (e.g., corresponding to small points of functionality). In other embodiments, the functional upgrade groups may be fairly broad (e.g., corresponding to entire product families). In one embodiment, the functional upgrade groups are broad enough to avoid a one-to-one correspondence between data upgrade files and groups, but granular enough to avoid a very small number of groups.

Figure 2:
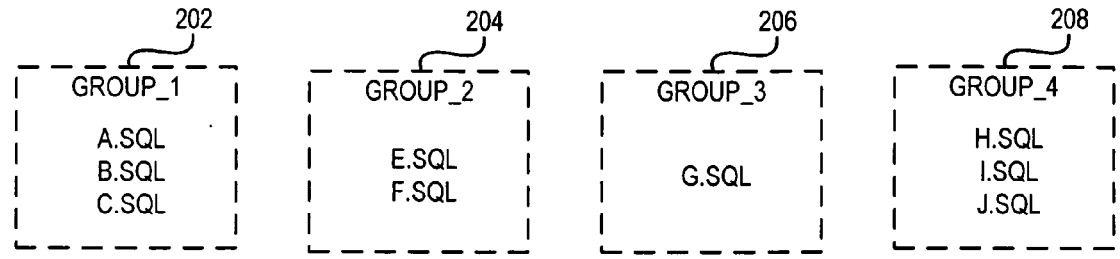
FIG. 2 illustrates data upgrade files grouped into exemplary functional upgrade groups.

FIG. 2 illustrates a plurality of exemplary data upgrade files (A.sql, B.sql, C.sql, D.sql, E.sql, F.sql, G.sql, H.sql, I.sql, J.sql) grouped into functional upgrade groups 202, 204, 206, 208 (GROUP_1, GROUP_2, GROUP_3, GROUP_4). In one set of embodiments, the data upgrade files correspond to database script files, such as SQL scripts. In other embodiments, the data upgrade files may be written in any scripting or programming language capable of upgrading data in a database or other type of data store.

As shown, each functional upgrade group 202, 204, 206, 208 is associated with a name (GROUP_1, GROUP_2, GROUP_3, and GROUP_4 respectively). In various embodiments, this name (referred to herein as an "upgrade token") is used to uniquely identify the functional upgrade group. Although not depicted in FIG. 2, data upgrade files A.sql, B.sql, C.sql, D.sql, E.sql, F.sql, G.sql, H.sql, I.sql, and J.sql may have certain inter-file dependencies between them. For the purposes of illustration, assume H.sql is dependent on (i.e., must be executed after) E.sql, E.sql is dependent on B.sql, and G.sql is dependent on A.sql. In this exemplary embodiment, all of the data upgrade files in a given functional upgrade group are independent.

Figure 3:
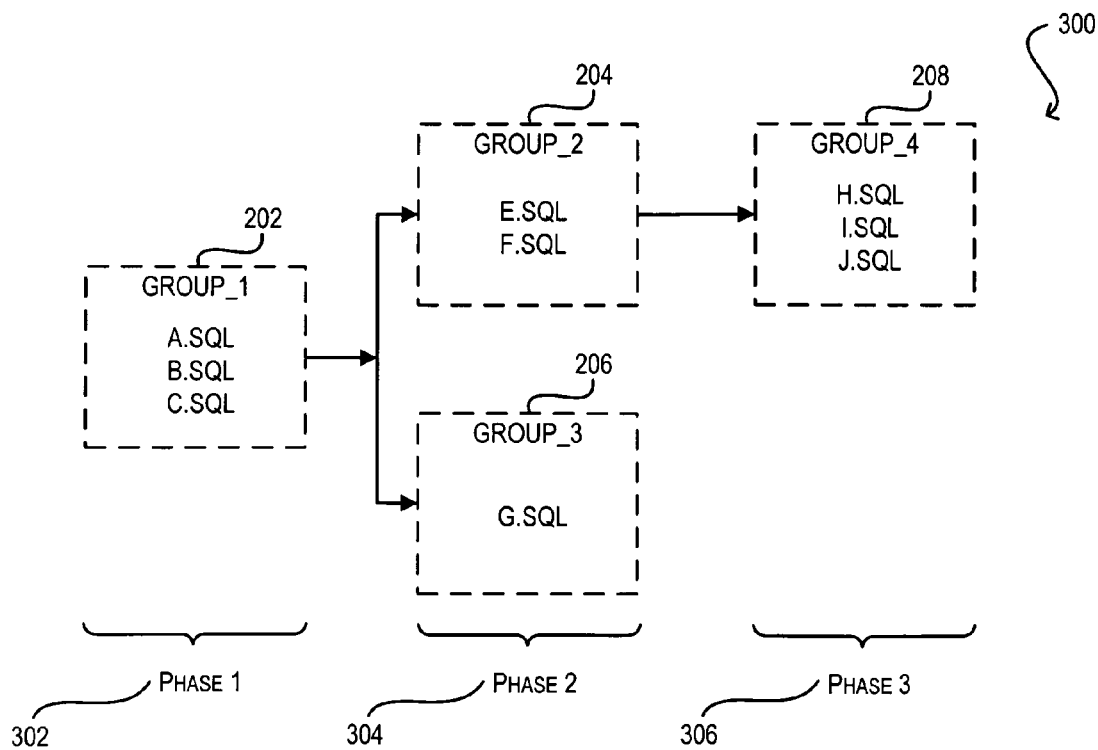
FIG. 3 illustrates an exemplary dependency hierarchy.

Returning to FIG. 1, after the data upgrade files are grouped, a dependency hierarchy for the functional upgrade groups is defined (104). In one aspect, this involves defining dependencies between the functional upgrade groups that preserve the dependencies between the data upgrade files. FIG. 3 illustrates an exemplary dependency hierarchy 300 for the data upgrade files and functional upgrade groups of FIG. 2. As shown, group 208 is dependent on group 204, and groups 204, 206 are dependent on group 202. This hierarchy preserves the dependencies between E.sql/H.sql, E.sql/B.sql, and G.sql/A sql described above.

Another aspect of defining dependency hierarchy 300 involves identifying execution phases for the functional upgrade groups. As used herein, an execution phase refers to an ordered phase or segment of an upgrade execution/run. Generally speaking, all of the data upgrade files within a particular execution phase may run simultaneously. However, files in a particular execution phase cannot run before files in prior execution phases. By creating mappings between functional upgrade groups and execution phases, a execution order or sequence for the groups (and thus, the data upgrade files within the groups) may be defined.

In one set of embodiments, functional upgrade groups are associated with execution phases according to a rule that allows a group G to be associated with any phase, as long as that phase occurs after the phases of other functional upgrade groups that group G is dependent upon in the dependency hierarchy. This mapping will result in an execution sequence that is consistent with the dependency hierarchy, but may not represent the most efficient ordering of data upgrade files.

In a preferred embodiment, functional upgrade groups are associated with execution phases in a manner that satisfies the rule above, but also seeks to minimize the total number of execution phases. For example, in FIG. 3, group 202 is associated with phase 1 (302), groups 204, 206 are associated with phase 2 (304), and group 208 is associated with phase 3 (306). This mapping represents the most efficient ordering of groups/files for this upgrade. In theory, group 206 could be associated with a phase 4 that occurs after phase 3 (306) because group 206 is only dependent on group 202 (which is in phase 1 (302)). However, by associating group 206 with phase 2 (304), the total number of phases is kept to three (the minimum possible number), thereby minimizing the total running time of the patch run.

Once a dependency hierarchy, such as hierarchy 300 of FIG. 3, has been defined, upgrade dependencies may be managed and organized at the functional level. As a result, changes or additions to the execution sequence of an application upgrade can be better understood and controlled, resulting in more robust and efficient upgrades.

In some embodiments, steps 102, 104 of FIG. 1 may be performed on all of the data upgrade files of an upgrade/patch at a single time. This would most likely occur immediately prior to the building and testing of the patch. In this scenario, dependency management is deferred to the end of the development lifecycle. In other embodiments, steps 102, 104 may be performed incrementally on a file-by-file basis. For example, a data upgrade file may be classified into a functional upgrade group at the time of its creation (102). As additional data upgrade files are created and/or modified, the functional upgrade groups and dependency hierarchy would be modified accordingly.

In one set of embodiments, the definition of functional upgrade groups and a dependency hierarchy (as shown in steps 102, 104 of FIG. 1) may enable automated validation of an execution of an upgrade. Specifically, an upgrade may be executed by executing the data upgrade files (106), and then validated by determining whether the data upgrade files were executed in an order consistent with the dependency hierarchy (108). In some embodiments, this validation makes use of an upgrade definition section that is included in each data upgrade file. The upgrade definition section contains a reference to an upgrade token (i.e., name of a functional upgrade group) corresponding to the file's functional upgrade group.

When an upgrade run needs to be validated, the executed data upgrade files are collected, and each file is parsed to extract the upgrade token. This upgrade token is used to determine the correct execution phase for the file. Finally, this determined execution phase is compared to the actual execution phase in which the data upgrade file was run to determine whether it was executed in a order consistent with the dependency hierarchy.

It should be appreciated that the specific steps illustrated in FIG. 1 provide a particular method for managing upgrade dependencies according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple substeps that may be performed in various sequences as appropriate to the individual step. Furthermore, additional steps may be added or removed depending on the particular applications. One of ordinary skill in the art would recognize many variations, modifications, and alternatives.

Figure 4:
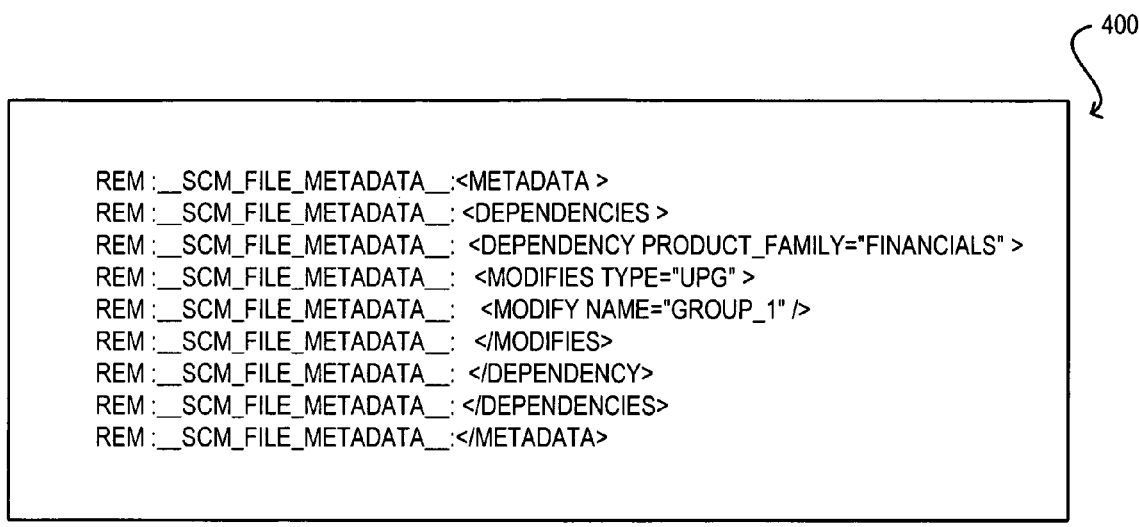
FIG. 4 illustrates an exemplary upgrade definition section for a data upgrade file.

FIG. 4 illustrates an exemplary upgrade definition section 400 for a data upgrade file. As described previously, this section is typically included in a data upgrade file to enable automated validation of a patch run. However, this section may also be used to enable other types of management functions related to an application upgrade. In the embodiment depicted, section 400 is structured in Extensible Markup Language (XML) according to a predefined XML schema. This allows section 400 to be parsed by any of a number of standard XML parsers. Alternatively, section 400 may be formatted in any other type of structured or unstructured format.

As shown, section 400 includes an attribute-value pair MODIFY NAME="GROUP_1." This corresponds to the upgrade token for the data upgrade file. Section 400 may also include other attributes, such as PRODUCT_FAMILY, TYPE, and the like. For example, PRODUCT_FAMILY may be used to identify a product family to which the data upgrade file belongs. TYPE may be used to distinguish metadata in section 400 that pertains to upgrade dependencies, and metadata that pertains to other types of dependencies. One of ordinary skill in the art will appreciate that many other types of attributes may be defined and included in section 400.

Figure 5:
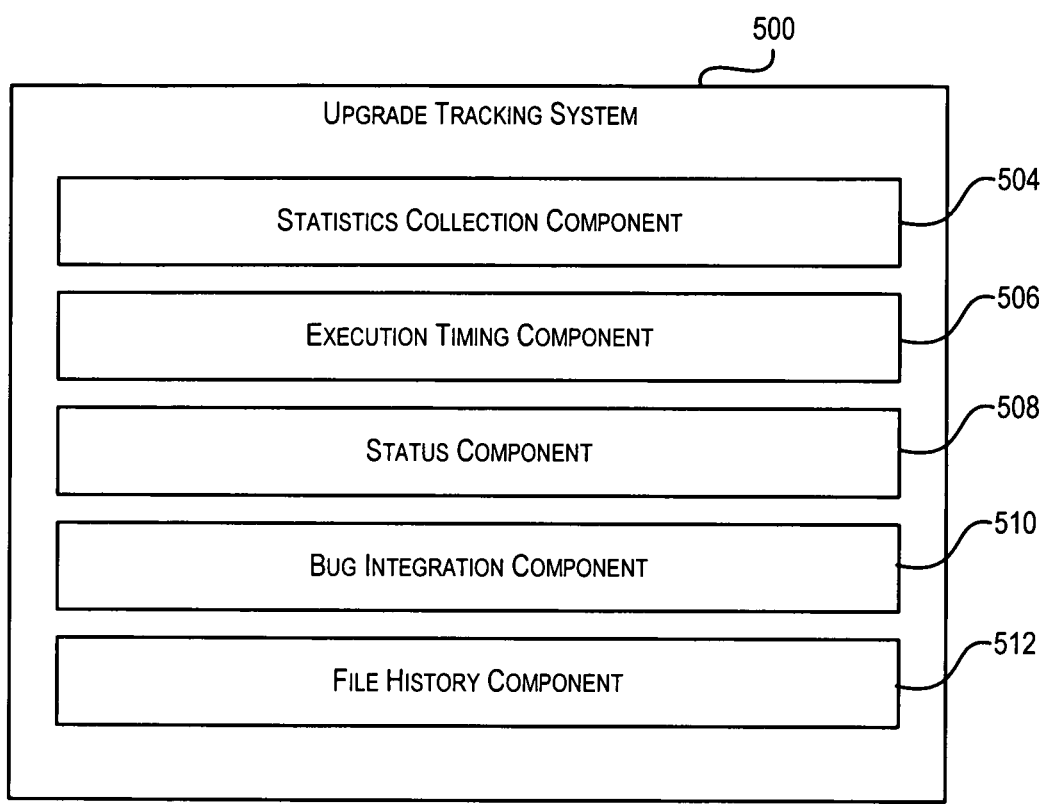
FIG. 5 is a simplified block diagram of an upgrade tracking system in accordance with an embodiment of the present invention.

In addition to upgrade dependency management, embodiments of the present invention provide techniques and systems for tracking various aspects of an upgrade run. In some embodiments, these techniques and systems leverage the functional upgrade groups and dependency hierarchy described above to present various patch run metrics at a functional, rather than upgrade file, level. FIG. 5 is a simplified block diagram of an upgrade tracking system 500 in accordance with an embodiment of the present invention. Upgrade tracking system 500 may be implemented in software, hardware, or combinations thereof. For example, as software, system 500 may be implemented as part of an upgrade tracking application. Further, the software may be stored on a machine-readable medium. As hardware, portions of system 500 may be, for example, programmed into one or more field-programmable gate arrays (FPGAs) or fabricated as one or more application-specific integrated circuits (ASICs). One of ordinary skill in the art would recognize many variations, modifications, and alternatives.

As shown, system 500 includes a statistics collection component 504, execution timing component 506, status component 508, bug integration component 510, and file history component 512. In various embodiments, statistics collection component 504 is configured to collect statistics from an application database/environment after an execution of an application upgrade. These statistics may include, for example, execution timings of data upgrade files, the file version of each executed data upgrade file, and the like. Generally speaking, statistics collection component 504 is responsible for collecting the data used by other components 506, 508, 510, 512 to generate reports about an upgrade run. In one set of embodiments, this data is stored in an upgrade tracking database accessible to upgrade tracking system 500.

Execution timing component 506 is responsible for reporting execution timings related to an upgrade run. In one set of embodiments, execution timing component 506 is configured to report execution timings for individual data upgrade files. In additional embodiments, component 506 may be configured to report aggregate execution timings of data upgrade files per functional upgrade group, product family, or some other category. These aggregated timings provide insight into upgrade performance problems at a functional, rather than file, level. In various embodiments, execution timings may be reported as absolute values or as percentages of some total value (e.g., execution timing for a functional upgrade group, execution timing the entire upgrade, etc.).

Figure 6:
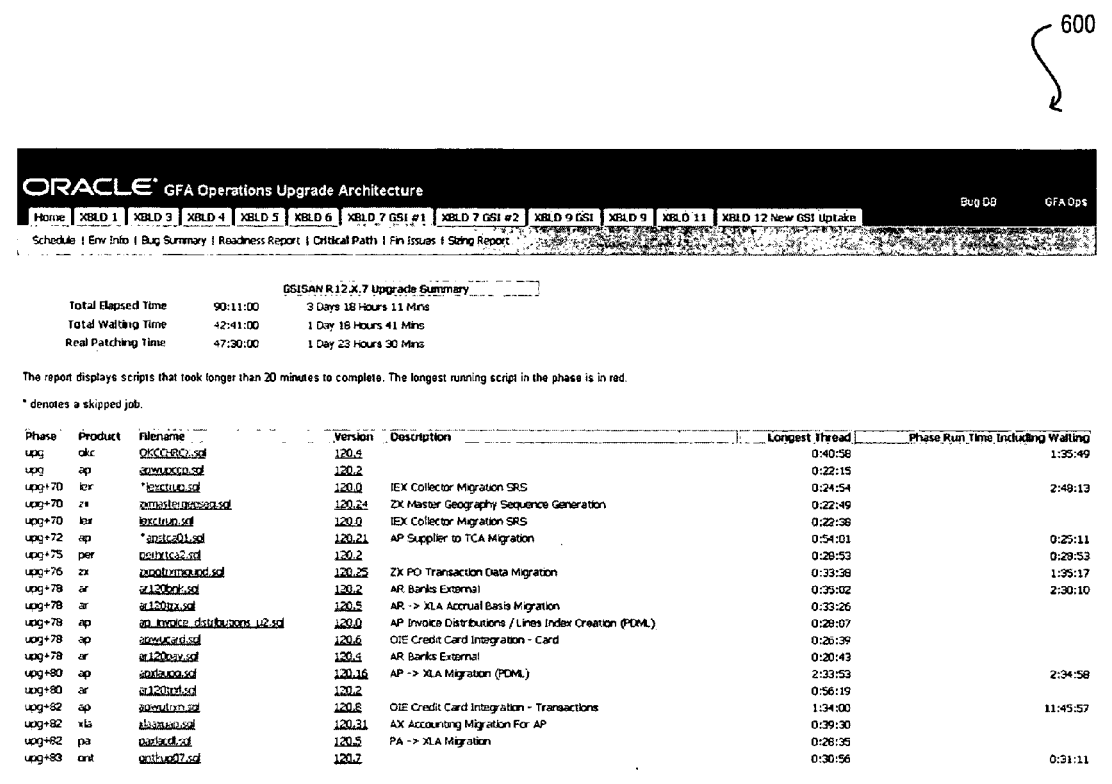

Execution timing component 506 may also be configured to generate intelligent reports based on execution timing statistics. By way of example, FIG. 6 illustrates an exemplary screen display 600 generated by execution timing component 506 that shows the critical path for an upgrade run. In this context, the critical path refers to the sequence of longest-running data upgrade files from the first execution phase to the last execution phase of the upgrade. As shown, screen display 600 includes the filename of each executed data upgrade file, the phase in which it was run, the file version, and the execution timing. The longest running file for each phase is highlighted in red, thereby denoting a file in the critical path. Other types of intelligent reports and/or filters (such as the top five longest running data upgrade files, etc.) are contemplated within the scope of the present invention. One of ordinary skill in the art would recognize many variations, modifications, and alternatives.

Status component 508 is responsible for tracking one or more statuses related to an upgrade run. Generally speaking, these statuses provide information to various stakeholders as to the state of the upgrade run. As with the execution timings described above, the statuses may be tracked and reported per data upgrade file, or may be aggregated per functional upgrade group, product family, upgrade, or some other category.

In one set of embodiments, status component 508 may automatically determine status updates based on data collected by statistics collection component 504. In alternative embodiments, status component 508 may determine responsible parties that are designated to provide status updates about specific functional upgrade groups and/or data upgrade files. Status component 508 may then provide a user interface or some other mechanism to the responsible parties that enables them to enter status updates into the system.

Figure 7:
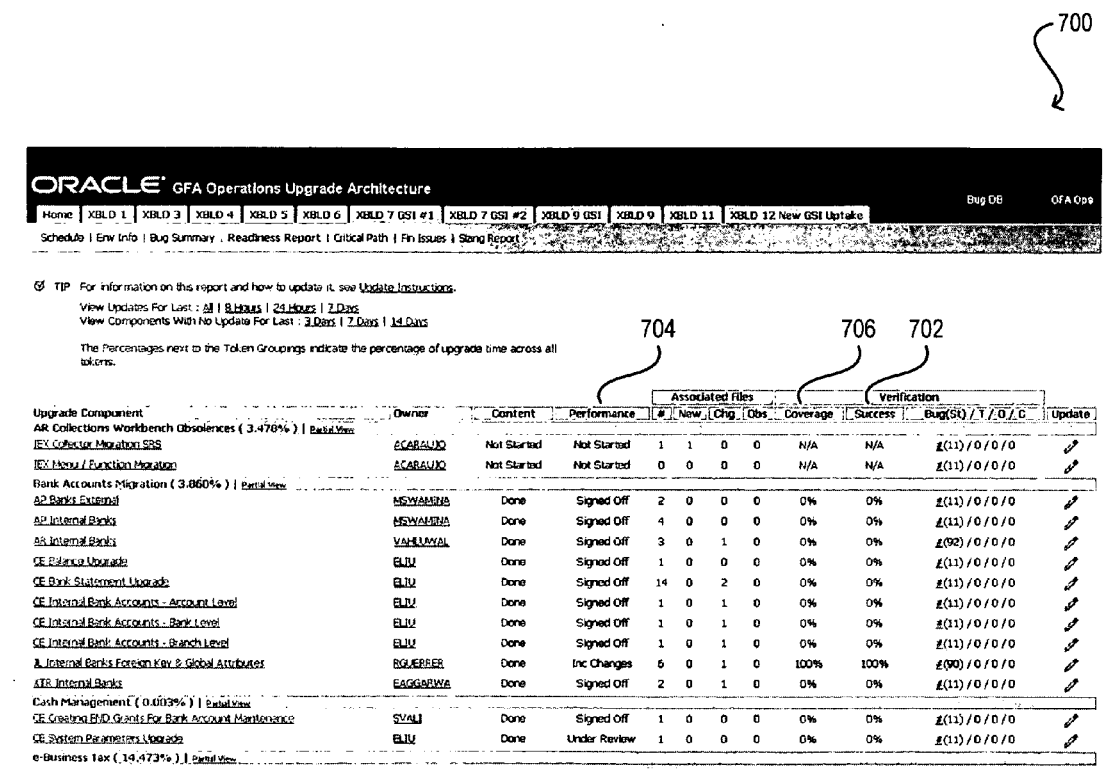

FIG. 7 illustrates an exemplary screen display 700 generated by status component 508 that enables responsible parties to view and update various statuses for functional upgrade groups. As shown, the statuses include a success status 702, a performance status 704, and a coverage status 706. In various embodiments, success status 702 indicates whether a responsible party has manually verified successful execution of one or more data upgrade scripts in a functional upgrade group. This type of manual verification may be necessary in instances where a data upgrade file does not error-out during execution, but nevertheless fails to carry out the operations it is designed to perform. This may occur, for example, if the data upgrade file is designed to migrate data stored in a number of database tables, but fails to do anything because one of the tables is empty (perhaps due to an upstream failure).

Performance status 704 indicates whether the responsible party has performed a performance review of one or more data upgrade files in a functional upgrade group. This provides insight into the significance of the execution timings of the files. For example, if the files have already undergone a performance review, the execution timings likely represent the best possible performance for the files. However, if the files have not been reviewed for performance, their execution timings might be improved through tuning.

Coverage status 706 indicates the extent to which the application database being upgraded contains data relevant to a data upgrade file or functional upgrade group. Like performance status 704, this status provides insight into the significance of execution timings. For example, if the application database contains, little, or no, data related to a particular functional upgrade group, the execution timings of the files in that group are likely poor indicators of upgrade performance in a more typical environment that contains large amounts of data.

In various embodiments, other types of statuses related to a patch run are contemplated and within the scope of the present invention. Additionally, status component 508 may be configured to automatically log a bug against responsible parties after a patch run. This may be useful in reminding the responsible parties to provide status updates for the statuses described above.

Bug integration component 510 enables the tracking of bugs logged against a particular upgrade run. In many development organizations, bugs are logged and tracked through a dedicated bug server/database. Component 510 enables users interested in upgrade-related bugs to track the status of those bugs directly through upgrade tracking system 500.

In one set of embodiments, this integration is enabled by logging upgrade-related bugs using a predefined template identifiable by bug integration component 510. The predefined template may have various fields for bug information such as bug status, data upgrade file name, data upgrade file version, issue type, and the like. Once an upgrade has been executed, bug integration component 510 is configured to access the bug database and query bugs that include the predefined template. Component 510 may then parse each of the queried bugs to extract bug information from the predefined template. This bug information is summarized and presented to a user of upgrade tracking system 500.

In some embodiments, bug integration component 510 may store associations between bugs and data upgrade files in an upgrade tracking database of upgrade tracking system 500. Using these stored associations, bug integration component 510 may directly query a bug to receive bug updates for a specific data upgrade file.

FIG. 8 illustrates an exemplary screen display 800 showing a bug summary for an upgrade run in accordance with an embodiment of the present invention. As shown, screen display 800 includes a plurality of bug information fields including issue type, product family, file name, file version, bug status, reported date, and the like. Other types of bug information fields may also be included and are within the scope of the present invention.

Figure 9:
FIG. 9 illustrates an exemplary screen display of the upgrade tracking system that shows file history information in accordance with an embodiment of the present invention.

File history component 512 is configured to track history information, such as execution timings, for a data upgrade file across file versions, upgrade runs, and upgrade environments. As a result, this feature can provide insight into why a file is performing poorly (or well) in a particular scenario. FIG. 9 illustrates an exemplary screen display 900 showing history information for a data upgrade file in accordance with an embodiment of the present invention. As shown, screen display 900 displays a data row for each prior execution of the file in an upgrade instance. Each data row may include history information such as the version of the file, the patch/upgrade name, the database of the upgraded environment, an execution timing, and the like. In various embodiments, this information is stored and maintained in an upgrade tracking database of upgrade tracking system 500.

In additional to the components described above, upgrade tracking system 500 may also include a database sizing component configured to track and report statistics regarding the growth of database objects as a result of the execution of an upgrade. In one set of embodiments, database sizing component is configured to report growth per individual database object (e.g., table, index, etc.). In additional embodiments, the database sizing component may be configured to report aggregate database object growth per functional group, product family, or some other category.

Figure 10:
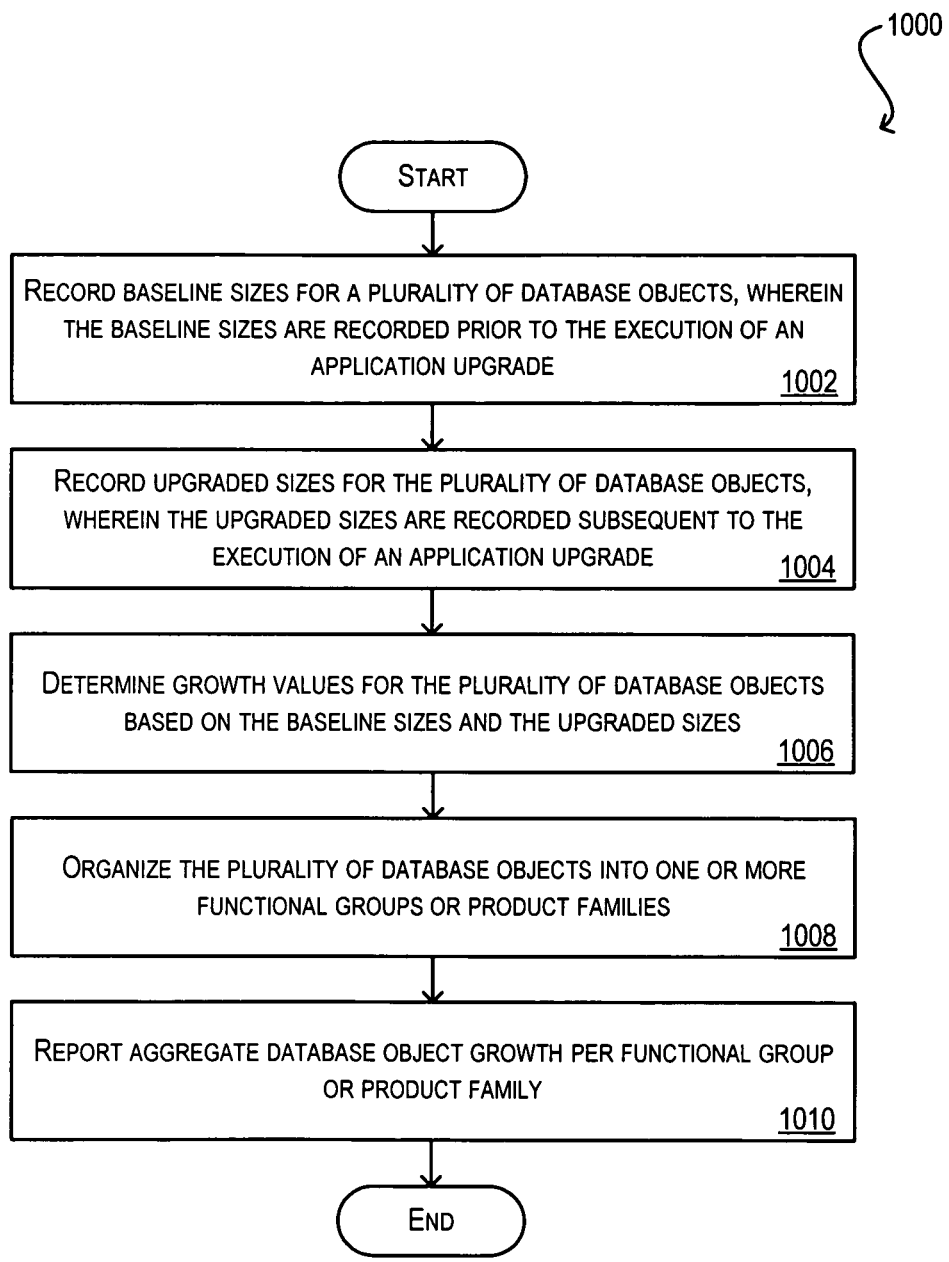
FIG. 10 is a flowchart of the steps performed in determining database object growth in accordance with an embodiment of the present invention.

FIG. 10 illustrates a flowchart 1000 of the steps performed in determining database object growth in accordance with an embodiment of the present invention. In various embodiments, the processing of flowchart 1000 may be implemented in software, hardware, or combinations thereof. For example, as software, flowchart 1000 may be implemented as part of an upgrade tracking application. Further, portions of flowchart 1000 may be performed manually (i.e., through human intervention). One of ordinary skill in the art would recognize many variations, modifications, and alternatives.

At step 1002, baseline sizes for a plurality of database objects are recorded, where the baseline sizes are recorded prior to the execution of an application upgrade. In one set of embodiments, baseline sizes for all of the database objects in a database may be recorded. Alternatively, baselines sizes for only specific database objects (e.g., database objects affected by the upgrade) may be recorded.

At step 1004, upgraded sizes for the plurality of database objects are recorded, where the upgraded sizes are recorded subsequent to the execution of the application upgrade. The upgraded sizes represent the new sizes of the database objects resulting from the execution of the upgrade.

Once the baselines sizes and upgraded sizes are recorded, growth values (i.e., size deltas) for the plurality of database objects are determined (1006). If a database object has increased in size, its growth value will be positive. Conversely, if a database object has decreased in size, its growth value will be negative. In various embodiments, the growth values may be represented in absolute values (e.g., megabytes (MB), gigabytes (GB), etc.) or percentages of some total (e.g., total growth of a functional group, or of the database).

In an exemplary embodiment, the plurality of database objects are organized into one or more functional groups or product families (1008), and aggregate database object growth per functional group or product family is reported (1010). This enables users to easily see how specific functional areas and/or product families are impacted by an upgrade. This also allows software vendors to provide more informed recommendations to customers regarding the amount of extra storage space needed to consume an upgrade.

It should be appreciated that the specific steps illustrated in FIG. 10 provide a particular method for determining database object growth according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
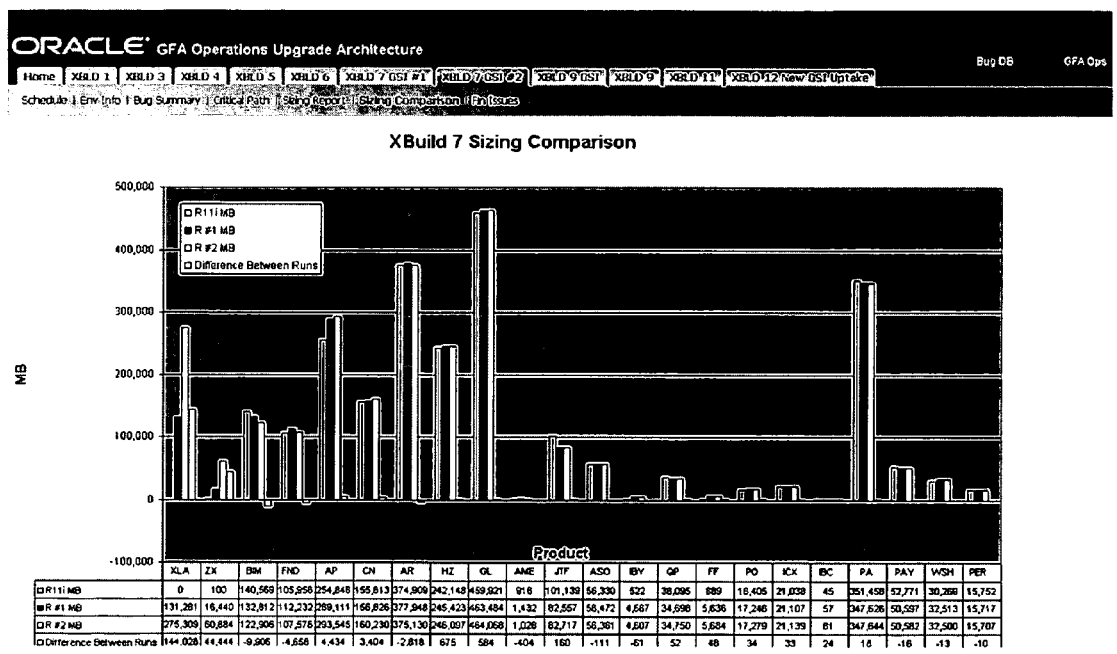
FIG. 12 is an exemplary screen display of the upgrade tracking system that shows database sizing information across different upgrade runs in accordance with an embodiment of the present invention.

FIGS. 11 and 12 illustrate exemplary screen displays 1100 and 1200 showing database growth/sizing information in accordance with an embodiment of the present invention. Screen display 1100 displays this information in a tabular format, and screen display 1200 displays this information in a graphical format. As shown in both 1100 and 1200, growth values of database objects may be rolled-up to the product family level. They may also be rolled up to functional groups within a product, or any other predefined or user-defined category.

Figure 13:
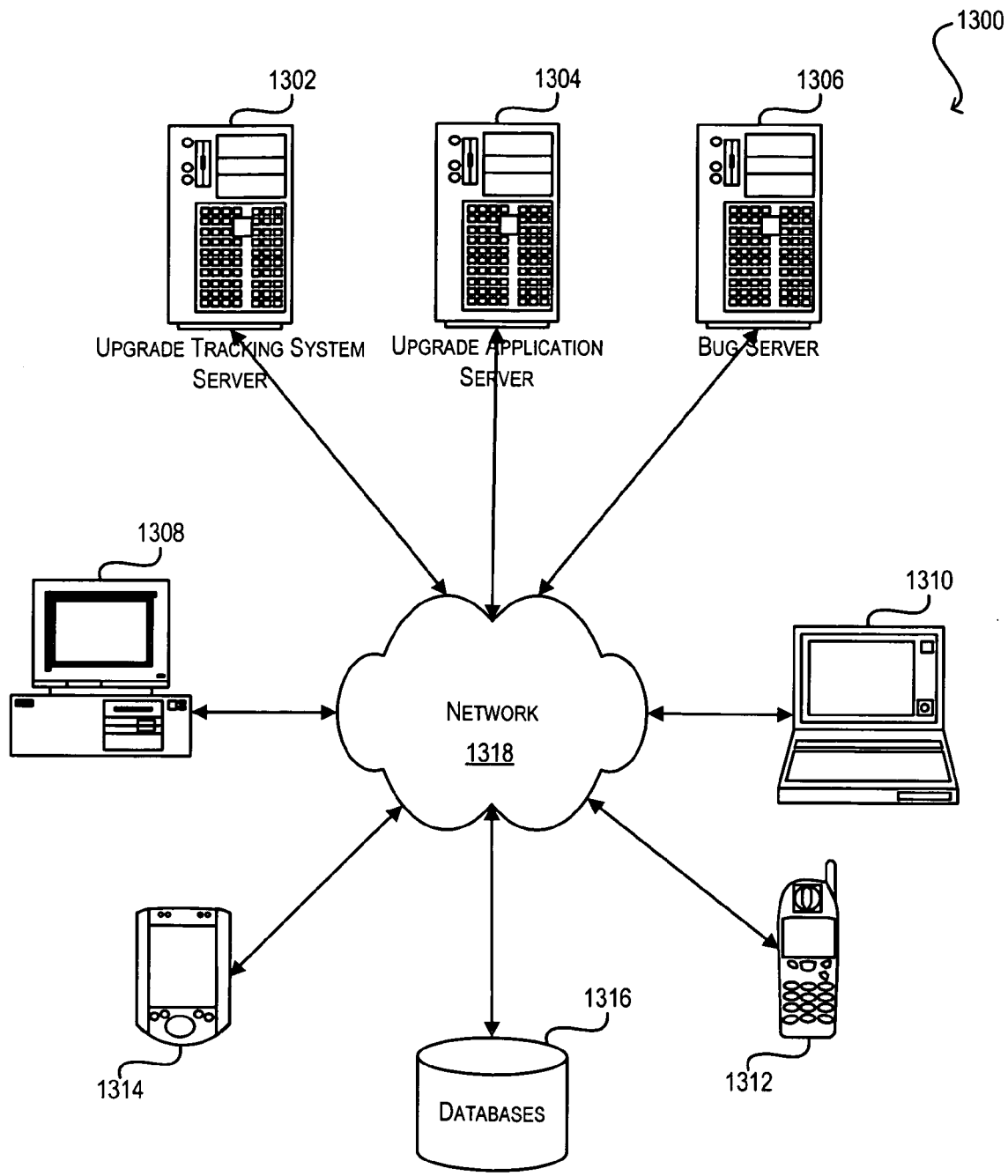
FIG. 13 is a simplified block diagram of a system environment that may be used in accordance with an embodiment of the present invention.

FIG. 13 is a simplified block diagram illustrating components of an exemplary system environment 1300 that may be used in accordance with an embodiment of the present invention. As shown, system environment 1300 includes one or more client computing devices 1308, 1310, 1312, 1314, which are configured to operate a client application such as web browser, proprietary client (e.g., Oracle Forms), or the like. In various embodiments, client computing devices 1308, 1310, 1312, 1314 are used by one or more users to interact with upgrade tracking system 500 of FIG. 5. For example, client computing devices 1308, 1310, 1312, 1314 may be used to view screen displays 600, 700, 800, 900, 1100, 1200 of FIGS. 6, 7, 8, 9, 11, 12 respectively. Additionally, client computing devices 1308, 1310, 1312, 1314 may be used to submit information, such as status information, to upgrade tracking system 500.

Client computing devices 1308, 1310, 1312, 1314 may be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1308, 1310, 1312, 1314 may be any other electronic device, such as a thin-client computer, Internet-enabled gaming system, and/or personal messaging device, capable of communicating over network (e.g., network 1318 described below) and/or displaying and navigating Web pages or other types of electronic documents. Although exemplary system environment 500 is shown with four client computing devices, any number of client computing devices may be supported.

In most embodiments, system environment 1300 includes a network 1318. Network 1300 may be any type of network familiar to those skilled in the art that can support data communications using any of a variety of commercially-available protocols, including without limitation TCP/IP, SNA, IPX, AppleTalk, and the like. Merely by way of example, network 1300 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1300 also includes one or more server computers 1302, 1304, 1306 which may be general purpose computers, specialized server computers (including, merely by way of example, PC servers, UNIX servers, mid-range servers, mainframe computers rack-mounted servers, etc.), server farms, server clusters, or any other appropriate arrangement and/or combination. In various embodiments, one or more of the servers 1302, 1304, 1306 may be adapted to run one or more systems or processes described in the foregoing disclosure. For example, as showing in FIG. 1300, server 1302 may act as an upgrade tracking system server configured to run upgrade tracking system 500. Server 1304 may act as an upgrade server configured to execute and/or validate an application upgrade as described in flowchart 100. And server 1306 may act as bug server configured to provide an interface to a bug database.

Each server 1302, 1304, 1306 may run an operating system including any of those discussed above, as well as any commercially-available server operating system. Servers 1302, 1304, 1306 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1300 may also include one or more databases 1316. For instance, databases 1316 may include an application database configured to store data for an application, an upgrade database configured to store data upgrade files to be executed as part of an upgrade, an upgrade tracking database configured to store a variety of analytics/statistics related to one or more upgrade runs, a bug database configured to store bugs logged as a result of one or more upgrade runs, as well as any other type of database or data storage component described in this disclosure. Databases 1316 may reside in a variety of locations. By way of example, one or more of databases 1316 may reside on a storage medium local to (and/or resident in) one or more of the computers 1302, 1304, 1306, 1308, 1310, 1312, 1314. Alternatively, databases 1316 may be remote from any or all of the computers 1302, 1304, 1306, 1308, 1310, 1312, 1314, and/or in communication (e.g., via network 1318) with one or more of these. In one set of embodiments, databases 1316 may reside in a storage-area network (SAN) familiar to those skilled in the art. Similarly, any necessary files for performing the functions attributed to the computers 1302, 1304, 1306, 1308, 1310, 1312, 1314 may be stored locally on the respective computer and/or remotely, as appropriate. In one set of embodiments, databases 1318 may include relational databases, such as Oracle 10g, that are adapted to store, update, and retrieve data in response to SQL-formatted commands.

Figure 14:
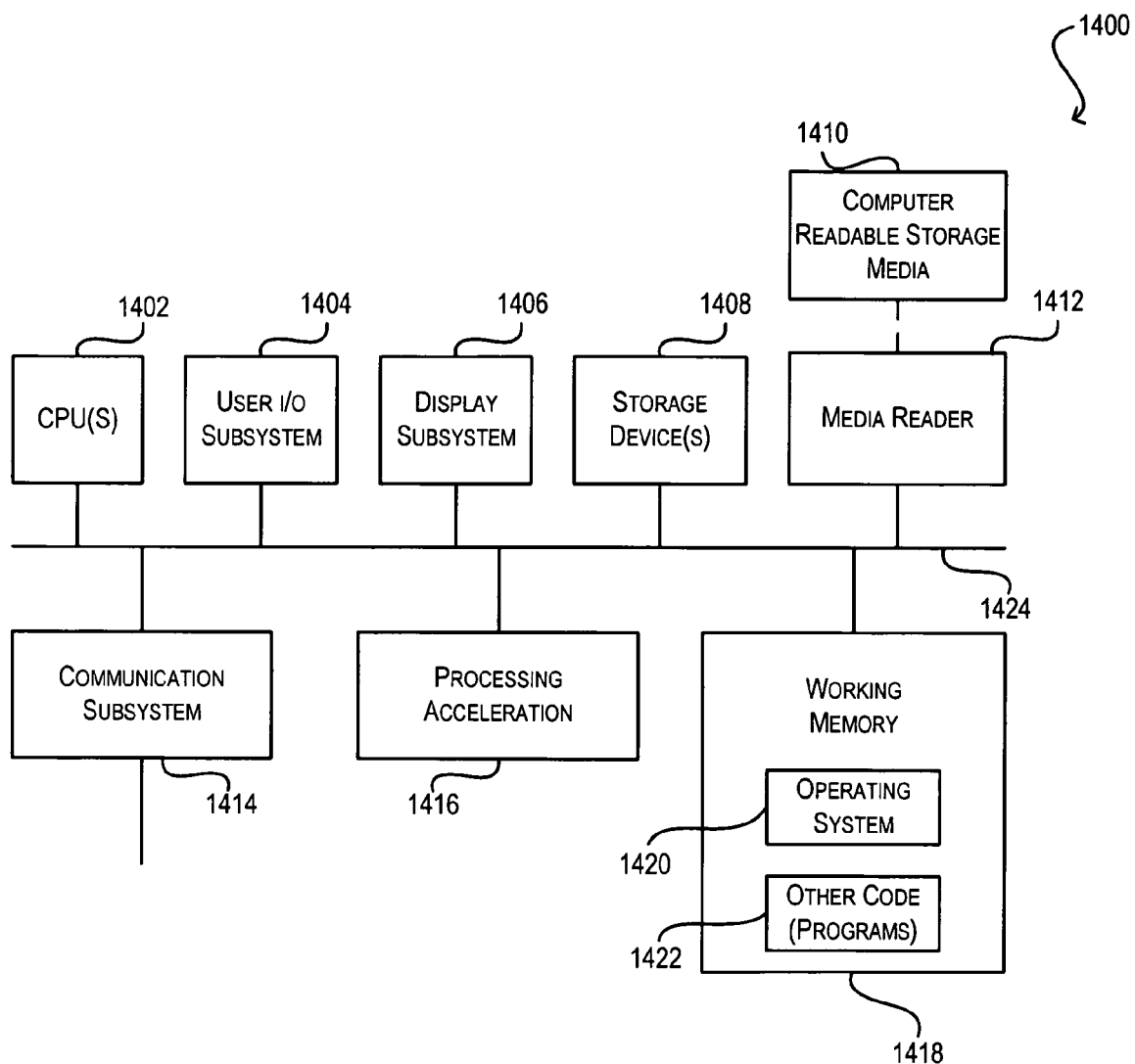
FIG. 14 is a simplified block diagram of a computer system that may be used in accordance with an embodiment of the present invention.

FIG. 14 illustrates an exemplary computer system 1400 that may be used in accordance with embodiments of the present invention. In various embodiments, system 1400 may be used to implement any of the computers 1302, 1304, 1306, 1308, 1310, 1312, 1314 described above. Computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). Computer system 1400 may also include one or more storage devices 1408. By way of example, the storage device(s) 1408 may include devices such as disk drives, optical storage devices, solid-state storage device such as a random access memory (RAM) and/or a read-only memory (ROM), which can be programmable, flash-updateable and/or the like.

Computer system 1400 may additionally include a computer-readable storage media reader 1412, a communications system 1414 (e.g., a modem, a network card (wireless or wired), an infra-red communication device, etc.), and working memory 1418, which may include RAM and ROM devices as described above. In some embodiments, computer system 1400 may also include a processing acceleration unit 1416, which can include a digital signal processor (DSP), a special-purpose processor, and/or the like.

Computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing computer-readable information. Communications system 1414 may permit data to be exchanged with network 1318 and/or any other computer described above with respect to system environment 1300.

Computer system 1400 may also comprise software elements, shown as being currently located within a working memory 1418, including an operating system 1420 and/or other code 1422, such as an application program (which may be a client application, Web browser, mid-tier application, RDBMS, etc.). It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An upgrade tracking system comprising:
   a computer, including a computer readable storage medium and processor;
   a statistics collection component, executing on the processor, configured to collect statistics related to updating an application by executing an application upgrade, wherein the application upgrade includes a plurality of data upgrade files, each upgrade file of the plurality of data upgrade files, when executed, modifies the application, wherein the application upgrade is divided into a plurality of execution phases, and wherein each upgrade file is associated with one of the plurality of execution phases; and
   wherein the plurality of data upgrade files are organized into a plurality of functional upgrade groups;
   wherein each data upgrade file is assigned to one or more of the plurality of functional upgrade groups;
   a timing component, executing on the processor, configured to measure and report an amount of time to complete execution of:
      each functional upgrade group of the plurality of functional upgrade groups; or
      each data upgrade file of the plurality of data upgrade files;
   wherein the timing component is further configured to identify a critical path of the application upgrade, wherein the critical path includes a sequence of data upgrade files including a data upgrade file from each execution phase, that is associated with a longest amount of time to complete execution; and
   a status component, executing on the processor, configured to track a status of each data upgrade file or functional upgrade group of the application upgrade.

2. The system of claim 1, wherein the timing component is configured to report an aggregate amount of time to complete execution of each functional upgrade group, wherein the aggregate amount of time to complete execution of said each functional upgrade group comprises a sum of the amount of time to complete execution of each data upgrade file assigned to said each functional upgrade group.

3. The system of claim 1, wherein one or more data upgrade files is associated with upgrading a product family; and
   the timing component is configured to report an aggregate amount of time to upgrade the product family, wherein the aggregate amount of time to upgrade the product family comprises a sum of the amount of time to complete execution of each of the data upgrade files associated with the product family.

4. The system of claim 1, wherein the timing component is further configured to highlight the sequence of data upgrade files included in the critical path to visually denote the critical path.

5. The system of claim 1, wherein tracking statuses related to the execution of the application upgrade comprises:
   automatically determining a responsible party for each data upgrade file or each functional upgrade group; and
   receiving, from the responsible party, one or more status updates related to the data upgrade file or the functional upgrade group.

6. The system of claim 5, wherein the one or more status updates include an update of a success status indicating whether the data upgrade file or functional upgrade group was executed successfully during the execution of the application upgrade.

7. The system of claim 6, wherein the success status is represented by a percentage value.

8. The system of claim 5, wherein the one or more status updates include an update of a completion status indicating whether the responsible party has completed validation of the data upgrade file or functional upgrade group.

9. The system of claim 5, wherein the one or more status updates include an update of a performance status indicating whether the responsible party has completed a performance review of the data upgrade file or functional upgrade group.

10. The system of claim 5, wherein the status component is further configured to automatically log a bug against the responsible party after the execution of the application upgrade, thereby reminding the responsible party to provide the one or more status updates.

11. The system of claim 1 further comprising a bug integration component configured to report bugs logged against one or more data upgrade files in the plurality of data upgrade files as a result of the execution of the application upgrade.

12. The system of claim 11, wherein reporting bugs logged against one or more data upgrade files in the plurality of data upgrade files as a result of the execution of the application upgrade comprises:
    accessing a bug database;
    identifying one or more bugs in the bug database that include a predefined template; and
    collecting bug information from each bug in the one or more bugs by parsing the predefined template.

13. The system of claim 12, wherein the bug information includes a reference to a data upgrade file associated with the bug, a version of the data upgrade file, and an issue type.

14. The system of claim 1 further comprising a file history component configured to report upgrade history information for each data upgrade file in the plurality of data upgrade files.

15. The system of claim 14, wherein the upgrade history information includes prior executions of the data upgrade file and an execution timing for each prior execution.

16. A non-transitory machine-readable medium for a computer system, the non-transitory machine-readable medium having stored thereon a series of instructions which, when executed by a processing component, cause the processing component to:
    collect statistics related to an execution of an application upgrade, wherein the application upgrade includes a plurality of data upgrade files, and wherein the plurality of data upgrade files are organized into a plurality of functional upgrade groups, and each upgrade file of the plurality of data upgrade files is assigned to one or more functional upgrade groups of the plurality of functional upgrade groups, wherein the application upgrade is divided into a plurality of execution phases, and wherein each upgrade file is associated with one of the plurality of execution phases;
    report an amount of time to complete execution of each data upgrade file or each functional upgrade group of the application upgrade;
    identify a critical path of the application upgrade, wherein the critical path includes a sequence of data upgrade files including a data upgrade file, from each execution phase, that is associated with a longest amount of time to complete execution; and
    track statuses related to the execution of the application upgrade.

17. The non-transitory machine-readable medium of claim 16, wherein the series of instructions further cause the processing component to report bugs logged against one or more data upgrade files in the plurality of data upgrade files as a result of the execution of the application upgrade.

18. The non-transitory machine-readable medium of claim 16, wherein the series of instructions further cause the processing component to report upgrade history information for each data upgrade file in the plurality of data upgrade files.

19. The system of claim 5, wherein the status component is further configured to:
    display a user interface to the responsible party; and
    receive the one or more status updates from the responsible party through the user interface.

20. The system of claim 1, wherein the status component is further configured to:
    generate and display a user interface that displays a plurality of statuses for the plurality of functional upgrade groups; and
    receive, through the user interface, manual verification of execution of at least one data upgrade file, wherein the manual verification is received without the at least one data upgrade file indicating an error.

* * * * *

UNITED STATES PATENT AND TRADEMARK OFFICE
CERTIFICATE OF CORRECTION

PATENT NO.       : 8,752,040 B2
APPLICATION NO.  : 12/163094
DATED            : June 10, 2014
INVENTOR(S)      : Halliday Page 1 of 1

It is certified that error appears in the above-identified patent and that said Letters Patent is hereby corrected as shown below:

In the Specification

Column 6, line 4, delete "G.sql/A sql" and insert -- G.sql/A.sql --, therefor.

Signed and Sealed this
Sixteenth Day of December, 2014

Michelle K. Lee
*Deputy Director of the United States Patent and Trademark Office*